Patented Oct. 9, 1934

1,976,602

UNITED STATES PATENT OFFICE 1,976,602

PROCESS FOR BREAKING PETROLEUM EMULSIONS

Melvin De Groote and Wilbur C. Adams, St. Louis, and Bernhard Keiser, Webster Groves, Mo., assignors to Tretolite Company, Webster Groves, Mo., a corporation of Missouri No Drawing. Application April 3, 1933,
Serial No. 664,210

26 Claims. (Cl. 196—4)

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottom of oil storage tanks, and are commonly referred to as "cut oil", "roily oil", "emulsified oil", and "bottom settlings".

The object of our invention is to provide a novel and inexpensive process for separating emulsions of the character referred to into their component parts of oil and water or brine.

Briefly described, our process consists in subjecting a petroleum emulsion of the water-in-oil type to the action of a treating agent or demulsifying agent of the kind hereinafter described, thereby causing the emulsion to break down and separate into its component parts of oil and water or brine, when the emulsion is permitted to remain in a quiescent state after treatment, or is subjected to other equivalent separatory procedures.

U. S. Patent No. 1,467,831, to William S. Barnickel, dated September 11, 1923, discloses a process for breaking oil field emulsions by means of a modified fatty acid which may be in the form of an acid or a salt or an ester. Such modified fatty acids are obtained by the action of a chemical reagent on a fatty acid, with the result that there is formed addition products or substitution products of the fatty acid.

The treating agent used in our process consists of a substituted fatty acid obtained by replacing or substituting for the alcoholiform hydroxyl of an hydroxylated fatty acid body, a non-fatty, polybasic, carboxy acid residue. Such a substituted fatty acid may be designated by the type formula:

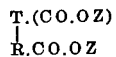

in which R represents the oxy-hydrocarbon residue of the oxy-hydrocarbon chain constituting the hydroxylated fatty material. COOZ represents the conventional carboxylic group of the hydroxylated fatty body, in which Z, an acidic hydrogen equivalent, may be an acidic hydrogen atom in the case of a fatty acid, or it may be a metal in the case of a salt, or it may be an organic radical, such as an ethyl radical in the case of an ester. Furthermore, the terminal group of the carboxylic radical, i. e., the group OZ may be replaced by an amine residue in an acyl amine derivative. T(COOZ) represents a non-fatty, polybasic carboxy acid residue, which is preferably of the non-sulfo aromatic type. The expression "non-fatty" is used in its ordinary sense, to indicate freedom from fatty acids of the kind employed in soap making and allied industries. The group (COOZ) indicates a carboxylic radical, which is designated as being within a parenthesis to show that it is a part of the polybasic carboxy acid residue, and may or may not be attached through the oxygen of the carboxylic hydroxyl to the fatty hydrocarbon R, or to some other group which may or may not be part of the molecule which also comprises R. Z in this group has the same significance as Z, previously referred to, except that in the event that Z represents an organic radical derived from an alcohol, it shall be derived solely from a monohydric alcohol body and not from glycerol, glycol and other polyhydric alcohols, and in addition, Z may not only be an organic radical, such as an ethyl radical, but may be a fatty acid radical, such as the residue of another hydroxy fatty acid group, or even the same fatty hydrocarbon group, in the case of certain polyhydroxy fatty acid bodies. While our preferred reagent is one in which an aromatic compound is combined with a fatty body, as herein specified, yet, in many instances, demulsifying agents of exceptional value are obtained by a similar reaction between fatty bodies and the simple aliphatic dibasic acids, such as oxalic acid.

Various reagents suitable for use in our process are produced in many instances by a relatively simple procedure, such as treating a hydroxylated fatty body, such as castor oil, with a dibasic acid anhydride, such as phthalic anhydride. We have indicated that Z is the acidic hydrogen equivalent of the fatty carboxylic group, and may be in the form of a salt or an ester or an amine residue, or an acid. Purely as a matter of convenience, it is most desirable that Z represent an organic radical, particularly an aliphatic group, such as a $C_2H_5$ radical, or a $C_3H_5$ radical, when there is more than one fatty acid radical, as in the case of a polyvalent ester, such as a glyceride. If Z represents an acidic hydrogen, then one may have reactions taking place between Z and the alcoholiform hydroxyl of R, or the alcoholiform hydroxyl of other fatty acid groups. If Z represents a metal, then great care must be taken that the salt is substantially anhydrous, in order that the indicated reactions may take place, and it is extremely difficult to completely dry the salts of fatty materials without decomposition. In the case where OZ represents an amine derivative, there is also the added expense of producing the substituted amine and usually without compensating advantage. Thus, in the subsequent discussion of the reactions producing the reagent, it will be considered that Z represents an organic group, i. e., that the hydroxylated fatty acid body be in the form of an ester, even though it is illustrated more simply as the acid. One might use the ester of a monovalent radical, such as an ethyl radical, or one might use the ester of a divalent radical, but it is preferable to use the ester of a trivalent radical, that is, $C_3H_5$ (glycerol radical), because hydroxylated fatty acids are available commercially as castor oil, which is the triglyceride of ricinoleic acid.

In order to indicate clearly the type of modified fatty acids, and more specifically, the type of substituted fatty acids which is contemplated as the reagent of our present invention, we will refer briefly to the chemistry and chemical structure of these materials. In the subsequent formulas it is not intended that they show isomeric forms or space relationships. The formulas are intended to show the composition and structure relationships. It is understood, in many instances, that there may be one or more isomeric forms. No attempt is made to distinguish between the various isomeric forms, because it appears that one isomeric form is just as suitable as another.

Oleic acid may be indicated by the following formula:

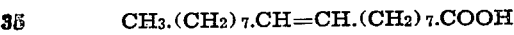

When oleic acid is subjected to a sulfation process, there is produced oleic acid hydrogen hydrogen sulfate, which is sometimes called sulfostearic acid, and may be indicated by the following formula:

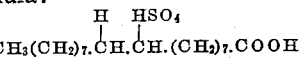

In other words, oleic acid hydrogen hydrogen sulfate is a modified fatty acid, that is, an addition product of oleic acid.

If oleic acid, together with the proper quantity of benzene is subjected to a sulfonation process, there is produced oleic acid hydrogen benzene sulfonic acid, which is a well known Twitchell reagent, and which is shown by the following formula:

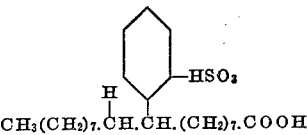

This is often referred to as benzene stearosulfonic acid. This product also is a modified fatty acid, that is, an addition product of oleic acid, in which there is added a hydrogen atom and a benzene sulfonic acid radical to oleic acid.

If, in a reaction of the kind designated above one replaces benzene with benzoic acid, then the reaction would produce a material of the type indicated by the following formula:

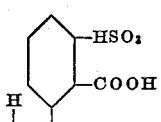

It is difficult to cause the reactions to take place so as to produce any appreciable yield of the above product; even when such a product is obtained, the sulfonic radical in the aromatic nucleus completely overbalances the influence of the carboxylic group attached to the aromatic nucleus. This is readily understood when one realizes that benzene sulfonic acid is water-soluble, whereas, phthalic acid is relatively insoluble in water. Thus, the valuable effect of the carboxyl group in the aromatic nucleus is lost, due to the simultaneous presence of a sulfonic group. More broadly, if one desires to obtain a substituted fatty acid body (which is one type of a modified fatty acid body) in which there is substituted in the fatty hydrocarbon chain an organic polybasic carboxy acid residue, particularly a non-sulfo, aromatic, dibasic acid residue, then one preferably resorts to a reaction between a polybasic carboxy acid or its anhydride and a hydroxy fatty acid. For instance, hydroxystearic acid indicated by the following formula may be obtained by hydrolysis of oleic acid hydrogen hydrogen sulfate previously referred to:

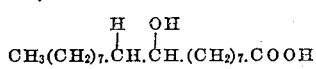

One may react hydroxystearic acid with an organic polybasic carboxy acid, such as phthalic acid. The reaction is hastened by the presence of conventional materials of the type of dry-hydrochloric acid gas and the like. In the course of such reaction, which is the simple esterification of a secondary alcohol, water is split off and carried away by the dry gas. The course of the reaction may be indicated by the following formula:

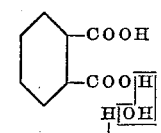

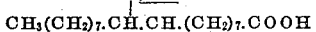

As a matter of convenience, the reaction is preferably conducted by means of phthalic anhydride. When phthalic anhydride is used, no water is formed, and as a result, the reaction goes more readily, because it is conducted in substantially an anhydrous state at all times. The reaction can be readily conducted by intimately mixing phthalic anhydride with a hydroxylated fatty body and heating to a temperature approximating the melting point of phthalic anhydride. Indeed, an inert solvent, such as xylene may be present, and the reaction may be conducted at even a lower temperature. The xylene or some other solvent may be removed at the end of the reaction, or it may be permitted to remain and become a suitable diluent in the finished demulsifying agent.

However, as previously indicated, there is no need to employ hydroxystearic acid, and one preferably employs a suitable form of ricinoleic acid. Ricinoleic acid is indicated by the following formula:

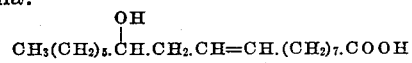

When the reaction takes place between phthalic anhydride and ricinoleic acid, the resulting product is a substituted ricinoleic acid in which the phthalic acid residue has replaced the alcoholiform hydroxyl of the ricinoleic acid. It is a true modified fatty acid in the sense employed by Barnickel in U. S. Patent No. 1,467,831, previously referred to, and it is a variety of modified fatty acid usually referred to as a substituted fatty acid, and is illustrated thus:

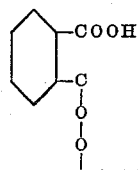

$$CH_3(CH_2)_5.CH.CH_2CH=CH.(CH_2)_7.COOH$$

Previous reference has been made to the fact that the use of a glyceride is very desirable, because it enables one to control reactions which might involve the fatty carboxylic hydrogen, if present.

Castor oil, the triglyceride of ricinoleic acid, may be indicated by the following formula:

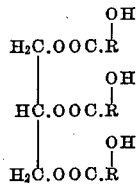

It is obvious that in the treatment of a triglyceride of a hydroxylated fatty acid, such as castor oil, or the triglyceride of hydroxystearic acid one may replace a single alcoholiform hydroxyl of the molecule by the phthalic acid residue, or one may replace two of the hydroxyl groups, or one may replace all three of the hydroxyl groups. Generally speaking, we have found it most desirable to replace all three of the hydroxyl groups.

It is also true that the carboxyl attached to the aromatic nucleus may react with one of the remaining alcoholiform hydroxyls. For instance, if a molecular quantity of ricinolein is heated at approximately 180° C., or higher, with one mole of phthalic anhydride, the reaction will ultimately involve two hydroxyls, by esterification with loss of water, as indicated by the following formula:

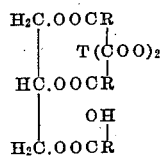

It is to be noted that this material is cyclic in nature. The word "cyclic" is used in the sense to indicate a closed chain and is not used to indicate the aromatic nucleus T. The remaining hydroxyl group indicated in the formula may be permitted to remain as such, or might be treated with another mole of phthalic anhydride to enter the type of reaction in which no water is formed, as referred to above. The same sort of cyclic formation might take place when a dihydroxy fatty acid, such as dihydroxystearic acid is treated with phthalic anhydride. Such reaction might also be involved in the treatment of a divalent ester of ricinoleic acid. Although not forming a cyclic body, such reaction with loss of water might also involve two separate ricinoleic acid molecules.

In order to indicate the colloidal character of the material contemplated in the present invention, one might point out that if two moles of ricinoleic acid triglyceride are treated with three moles of phthalic anhydride, one may obtain a condensation product in which the molecular weight in an unpolymerized state would be approximately 2,000. One would naturally expect such high molecular weight organic material to have peculiar colloidal properties.

Having thus defined the type of modified fatty acid which constitutes the reagent employed for breaking oil field emulsions, it is desirable to indicate that one need not employ castor oil or hydroxystearic acid, but that one may use other materials of similar characteristics, such as blown oils, hydrogenated castor oil, various drying and semi-drying oils which have been hydroxylated by oxidation processes, or similar processes, such as treatment with potassium permanganate, organic peroxides, air, oxygen, ozone, etc. Likewise, it is to be understood that although phthalic anhydride is the most desirable aromatic reagent, one may use other polybasic carboxy acids or their anhydrides, such as succinic, malic, fumaric, citric, maleic, adipic, tartaric, glutaric, diphenic, naphthalic, oxalic, etc. In the example previously recited phthalic anhydride has been employed, because in many instances it is most desirable to use the anhydride of the aromatic acid, and also because phthalic anhydride is obtainable at a relatively low cost in a state of high technical purity. Furthermore, phthalic anhydride shows little or no tendency to produce objectionable secondary reactions, and when phthalic anhydride and ricinolein are employed, one may obtain almost theoretical yields of the desired products.

Other well known chemical compounds having the desirable properties indicated may be used to react and produce our improved demulsifying agent. For instance, in the formation of a salt, particularly a carboxylic salt, ammonia or basic amines, such as triethanolamine, may be used to produce the equivalent of a metallic salt. Castor oil may be subjected to the action of a halogen, so as to obtain a chlorine or bromine addition product, and this material may be employed. If a fatty acid sulfate of castor oil is available in such a form that the alcoholiform hydroxyl is still present, one may employ such sulfo fatty acid body. When a mole of triricinolein is treated with two or more moles of a polybasic acid or its anhydride, it is not necessary that the same anhydride be used. For instance, one might use one mole of phthalic anhydride and one mole of some other anhydride. If one had available diricinolein or monoricinolein, this material could be employed as well as ordinary castor oil. One might condense two moles of ricinoleic acid so as to produce one mole of monobasic diricinoleic acid and employ this material. Likewise, monobasic triricinoleic acid or monobasic tetraricinoleic acid may be employed. Furthermore, the condensation product of ricinoleic acid or hydroxystearic acid, plus some non-fatty hydroxy acid, such as lactic acid, may be employed. The condensation products obtained by sulfation of castor oil may be used, if hydroxylated. Polyhydroxy materials are suitable. Chlorphthalic anhydride may be used.

It is our preference to employ castor oil and phthalic anhydride and to obtain a product in which three moles of phthalic anhydride combined with one mole of triricinolein, and in which there is present one carboxyl group attached to the aromatic nucleus for each alcoholiform hydroxyl group which has been replaced. This material, thus formed, may be used in the form of an acid, or in the form of a salt, or in the form of an ester, or in the other forms indicated. We prefer to neutralize the material with a theoretical amount or somewhat less of ammonium hydroxide or potassium hydroxide. We prefer to use the material in a water-soluble form. It may be used in an oil-soluble form, or even a form which exhibits both oil and water solubility.

The water-soluble form of the reagent produced by neutralization with caustic soda or caustic potash, may be reacted with a water-soluble salt of any suitable metal, such as aluminum, copper, iron, zinc, calcium, or magnesium, and thus, by metathesis one may obtain these various metallic salts. They may be employed, but appear to offer no advantage over the sodium or potassium or ammonium salt or the acidic material itself. Neutralization with triethanolamine or a similar basic amine gives a suitable product.

As a specific example of our preferred reagent we react 250 lbs. of phthalic anhydride with 500 lbs. of castor oil at a temperature of approximately 120 to 145° C. for approximately 6 to 12 hours. The reaction can be followed roughly by withdrawing a small sample of the partially reacted mass and permitting it to cool on a watch glass. When the reaction is completed, crystals of phthalic anhydride no longer appear. When the sample no longer shows the presence of such crystals on cooling, it can be titrated with a standard volumetric alkaline solution, so as to indicate that the acid which remains is due entirely to the carboxylic hydrogen and not due to any unreacted phthalic anhydride. One must guard against a rise in temperature, since higher temperatures tend to produce the cyclic bodies previously referred to. These cyclic bodies are suitable for use, but if formed during the reaction, one cannot depend upon the standard volumetric alkaline solution to indicate the disappearance of the phthalic anhydride. The product of reaction represents a viscous yellow oil not unlike blown castor oil in consistency. It is neutralized with sufficient ammonium hydroxide to completely convert all acidic material into the ammonium salt. The product thus obtained is substantially water-soluble and is suitable for use.

As previously intimated, if, in the procedure above described one replaces phthalic acid or phthalic anhydride with an equivalent quantity of oxalic acid, and employs a relatively low temperature, about 120° C. or less, so as to prevent decomposition of the oxalic acid and also to prevent the formation of cyclic bodies, one may obtain a substituted triricinolein in which one or more of the alcoholiform hydroxyls are replaced by a carboxylic oxalic acid residue. Such a material may be treated in regard to neutralization and metathesis in the same manner as the phthalic anhydride reagent, but as a matter of fact, it is a most excellent treating agent, even before neutralization, and in some respects, is superior to any other similar substituted castor oil body.

The materials previously described need not be employed alone, but may be employed in conjunction with other suitable demulsifiers, such as water softeners, modified fatty acids, oil-soluble or water-soluble petroleum sulfonic acids, substituted aromatic sulfonic acids, dialkyl sulfo acids, substituted amine acidic bodies, etc., or the salts and esters of the same or the like. One may add any suitable inert solvent or solvents to the reagent contemplated, particularly solvents which would lower the viscosity of the product and make it more adaptable for use, such as kerosene, solvent naphtha, cresol, pine oil, ethyl alcohol, butyl alcohol, propyl alcohol, etc.

In practising our process, a treating agent or demulsifying agent of the kind above described may be brought in contact with the emulsion to be treated in any of the numerous ways now employed in the treatment of petroleum emulsions of the water-in-oil type with chemical demulsifying agents, such, for example, as by introducing the treating agent into the well in which the emulsion is produced, introducing the treating agent into a conduit through which the emulsion is flowing, introducing the treating agent into a tank in which the emulsion is stored, or introducing the treating agent into a container that holds a sludge obtained from the bottom of an oil storage tank. In some instances, it may be advisable to introduce the treating agent into a producing well in such a way that it will become mixed with water and oil that are emerging from the surrounding strata, before said water and oil enter the barrel of the well pump or the tubing up through which said water and oil flow to the surface of the ground. After treatment the emulsion is allowed to stand in a quiescent state, usually in a settling tank, at a temperature varying from atmospheric temperature to about 200° F., so as to permit the water or brine to separate from the oil, it being preferable to keep the temperature low enough so as to prevent the valuable constituents of the oil from volatilizing. If desired, the treated emulsion may be acted upon by one or the other of various kinds of apparatus now used in the operation of breaking petroleum emulsions, such as homogenizers, hay tanks, gun barrels, filters, centrifuges or electrical dehydrators.

The amount of treating agent on the anhydrous basis that is required to break the emulsion may vary from approximately 1 part of treating agent to 500 parts of emulsion, up to a ratio of 1 part of treating agent to 20,000 parts of emulsion, depending upon the type or kind of emulsion being treated. In treating exceptionally refractory emulsions of the kind commonly referred to as "tank bottoms" or "residual pit oils", the minimum ratio above referred to is often necessary, but in treating fresh emulsions, i. e., emulsions that will yield readily to the action of chemical demulsifying agents, the maximum ratio above mentioned will frequently produce highly satisfactory results. For the average petroleum emulsion of the water-in-oil type a ratio of 1 part of treating agent to 10,000 parts of emulsion will usually be found to produce commercially satisfactory results.

Having thus described our invention, what we claim and desire to secure by Letters Patent is:

1. A process for breaking a petroleum emulsion of the water-in-oil type, which consists in subjecting the emulsion to the action of a demulsifying agent comprising a substituted hydroxylated fatty acid body, selected from the class consisting of acids, salts, esters and acyl amine derivatives, in which an alcoholiform hydroxyl has been replaced by a non-sulfo non-fatty, polybasic, carboxy acid residue, and further characterized by the fact that said non-fatty polybasic carboxy acid residue is free from any chemically combined polyhydric alcohol residue.

2. A process for breaking a petroleum emulsion of the water-in-oil type, which consists in subjecting the emulsion to the action of a demulsifying agent comprising a substituted hydroxylated fatty acid body, selected from the class consisting of acids, salts, esters and acyl amine derivatives, in which an alcoholiform hydroxyl has been replaced by a non-sulfo non-fatty, polybasic, carboxy acid residue, having a carboxyl radical in the form of an acid or a salt, and further characterized by the fact that said non-fatty polybasic carboxy acid residue is free from any chemically combined polyhydric alcohol residue.

3. A process for breaking a petroleum emulsion of the water-in-oil type, which consists in subjecting the emulsion to the action of a demulsifying agent comprising a substituted hydroxylated fatty acid body, selected from the class consisting of acids, salts, esters and acyl amine derivatives, in which an alcoholiform hydroxyl has been replaced by a non-sulfo aromatic, polybasic, carboxy acid residue, and further characterized by the fact that said non-fatty polybasic carboxy acid residue is free from any chemically combined polyhydric alcohol residue.

4. A process for breaking a petroleum emulsion of the water-in-oil type, which consists in subjecting the emulsion to the action of a demulsifying agent comprising a substituted hydroxylated fatty acid body, selected from the class consisting of acids, salts, esters and acyl amine derivatives, in which an alcoholiform hydroxyl has been replaced by a non-sulfo aromatic, polybasic, carboxy acid residue, having a carboxylic radical in the form of an acid or a salt, and further characterized by the fact that said non-fatty polybasic carboxy acid residue is free from any chemically combined polyhydric alcohol residue.

5. A process for breaking a petroleum emulsion of the water-in-oil type, which consists in subjecting the emulsion to the action of a demulsifying agent comprising a substituted hydroxylated fatty acid body, selected from the class consisting of acids, salts, esters and acyl amine derivatives, in which an alcoholiform hydroxyl has been replaced by a non-sulfo, monocyclic, aromatic, polybasic, carboxy acid residue, and further characterized by the fact that said non-fatty polybasic carboxy acid residue is free from any chemically combined polyhydric alcohol residue.

6. A process for breaking a petroleum emulsion of the water-in-oil type, which consists in subjecting the emulsion to the action of a demulsifying agent comprising a substituted hydroxylated fatty acid body, selected from the class consisting of acids, salts, esters and acyl amine derivatives, in which an alcoholiform hydroxyl has been replaced by a non-sulfo, monocyclic, aromatic, polybasic, carboxy acid residue, having a carboxylic radical in the form of an acid or a salt, and further characterized by the fact that said non-fatty polybasic carboxy acid residue is free from any chemically combined polyhydric alcohol residue.

7. A process for breaking a petroleum emulsion of the water-in-oil type, which consists in subjecting the emulsion to the action of a demulsifying agent comprising a substituted hydroxylated fatty acid body, selected from the class consisting of acids, salts, esters and acyl amine derivatives, in which an alcoholiform hydroxyl has been replaced by a non-sulfo, aromatic, dibasic carboxy acid residue, and further characterized by the fact that said non-fatty polybasic carboxy acid residue is free from any chemically combined polyhydric alcohol residue.

8. A process for breaking a petroleum emulsion of the water-in-oil type, which consists in subjecting the emulsion to the action of a demulsifying agent comprising a substituted hydroxylated fatty acid body, selected from the class consisting of acids, salts, esters and acyl amine derivatives, in which an alcoholiform hydroxyl has been replaced by a non-sulfo aromatic, dibasic, carboxy acid residue, having a carboxylic radical in the form of an acid or a salt, and further characterized by the fact that said non-fatty polybasic carboxy acid residue is free from any chemically combined polyhydric alcohol residue.

9. A process for breaking a petroleum emulsion of the water-in-oil type, which consists in subjecting the emulsion to the action of a demulsifying agent comprising a substituted hydroxylated fatty acid body, selected from the class consisting of acids, salts, esters and acyl amine derivatives, in which an alcoholiform hydroxyl has been replaced by a non-sulfo, monocyclic, aromatic, dibasic, carboxy acid residue, and further characterized by the fact that said non-fatty polybasic carboxy acid residue is free from any chemically combined polyhydric alcohol residue.

10. A process for breaking a petroleum emulsion of the water-in-oil type, which consists in subjecting the emulsion to the action of a demulsifying agent comprising a substituted hydroxylated fatty acid body, selected from the class consisting of acids, salts, esters and acyl amine derivatives, in which an alcoholiform hydroxyl has been replaced by a non-sulfo, monocyclic, aromatic, dibasic, carboxy acid residue, having a carboxylic radical in the form of an acid or a salt, and further characterized by the fact that said non-fatty polybasic carboxy acid residue is free from any chemically combined polyhydric alcohol residue.

11. A process for breaking a petroleum emulsion of the water-in-oil type, which consists in subjecting the emulsion to the action of a demulsifying agent comprising a substituted hydroxylated fatty acid body, selected from the class consisting of acids, salts, esters and acyl amine derivatives, in which an alcoholiform hydroxyl has been replaced by a phthalic acid residue, and further characterized by the fact that said non-fatty polybasic carboxy acid residue is free from any chemically combined polyhydric alcohol residue.

12. A process for breaking a petroleum emulsion of the water-in-oil type, which consists in subjecting the emulsion to the action of a demulsifying agent comprising a substituted hydroxylated fatty acid body, selected from the class consisting of acids, salts, esters and acyl amine derivatives, in which an alcoholiform hydroxyl has been replaced by a phthalic acid residue, having a carboxylic radical in the form of an acid or salt, and further characterized by the fact that said non-fatty polybasic carboxy acid residue is free from any chemically combined polyhydric alcohol residue.

13. A process for breaking a petroleum emulsion of the water-in-oil type, which consists in subjecting the emulsion to the action of a demulsifying agent comprising a substituted triricinolein, in which an alcoholiform hydroxyl has been replaced by a phthalic acid residue.

14. A process for breaking a petroleum emulsion of the water-in-oil type, which consists in subjecting the emulsion to the action of a demulsifying agent comprising a substituted triricinolein, in which an alcoholiform hydroxyl has been replaced by a phthalic acid residue, having a carboxylic radical in the form of an acid or salt.

15. A process for breaking a petroleum emulsion of the water-in-oil type, which consists in subjecting the emulsion to the action of a demulsifying agent comprising a substituted triricinolein, in which two alcoholiform hydroxyls have been replaced by phthalic acid residue.

16. A process for breaking a petroleum emulsion of the water-in-oil type, which consists in subjecting the emulsion to the action of a demulsifying agent comprising a substituted triricinolein, in which two alcoholiform hydroxyls have been replaced by phthalic acid residues, having a carboxylic radical in the form of an acid or salt.

17. A process for breaking a petroleum emulsion of the water-in-oil type, which consists in subjecting the emulsion to the action of a demulsifying agent comprising a substituted triricinolein, in which three alcoholiform hydroxyls have been replaced by phthalic acid residues.

18. A process for breaking a petroleum emulsion of the water-in-oil type, which consists in subjecting the emulsion to the action of a demulsifying agent comprising a substituted triricinolein, in which three alcoholiform hydroxyls have been replaced by phthalic acid residues, having a carboxylic radical in the form of an acid or salt.

19. A process for breaking a petroleum emulsion of the water-in-oil type, which consists in subjecting the emulsion to the action of a demulsifying agent comprising a substituted triricinolein, in which three alcoholiform hydroxyls have been replaced by phthalic acid residues, having a carboxylic radical in the form of a water-soluble salt.

20. A process for breaking a petroleum emulsion of the water-in-oil type, which consists in subjecting the emulsion to the action of a demulsifying agent comprising a substituted triricinolein, in which three alcoholiform hydroxyls have been replaced by phthalic acid residues, having a carboxylic radical in the form of an ammonium salt.

21. A process for breaking a petroleum emulsion of the water-in-oil type, which consists in subjecting the emulsion to the action of a cyclic demulsifying agent comprising a substituted hydroxylated fatty acid body, selected from the class consisting of acids, salts, esters and acyl amine derivatives, in which an alcoholiform hydroxyl has been replaced by a phthalic acid residue, and further characterized by the fact that said phthalic acid residue is free from any chemically combined polyhydric alcohol residue.

22. A process for breaking a petroleum emulsion of the water-in-oil type, which consists in subjecting the emulsion to the action of a demulsifying agent comprising a substituted hydroxylated fatty acd body, selected from the class consisting of acids, salts, esters and acyl amine derivatives, in which an alcoholiform hydroxyl has been replaced by an oxalic acid residue, having a carboxylic radical in the form of an acid or salt.

23. A process for breaking a petroleum emulsion of the water-in-oil type, which consists in subjecting the emulsion to the action of a demulsifying agent comprising a substituted triricinolein, in which an alcoholiform hydroxyl has been replaced by an oxalic acid residue, having a carboxylic radical in the form of an acid or salt.

24. A process for breaking a petroleum emulsion of the water-in-oil type, which consists in subjecting the emulsion to the action of a demulsifying agent comprising a substituted triricinolein, in which two alcoholiform hydroxyls have been replaced by oxalic acid residues, having a carboxylic radical in the form of an acid or salt.

25. A process for breaking a petroleum emulsion of the water-in-oil type, which consists in subjecting the emulsion to the action of a demulsifying agent comprising a substituted triricinolein, in which three alcoholiform hydroxyls have been replaced by oxalic acid residues, having a carboxylic radical in the form of an acid or salt.

26. A process for breaking a petroleum emulsion of the water-in-oil type, which consists in subjecting the emulsion to the action of a demulsifying agent comprising a substituted hydroxylated fatty acid body, selected from the class consisting of acids, salts, esters and acyl amine derivatives, in which an alcoholiform hydroxyl has been replaced by an oxalic acid residue.

MELVIN DE GROOTE.
WILBUR C. ADAMS.
BERNHARD KEISER.